Sept. 20, 1932.  A. E. STACEY, JR., ET AL  1,878,012
AIR CONDITIONING AND DISTRIBUTING UNIT
Filed June 25, 1930    2 Sheets-Sheet 1

INVENTORS.
Alfred E. Stacey Jr. & Carlyle M. Ashley.
BY
ATTORNEY

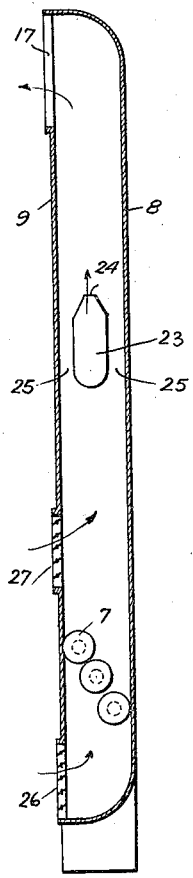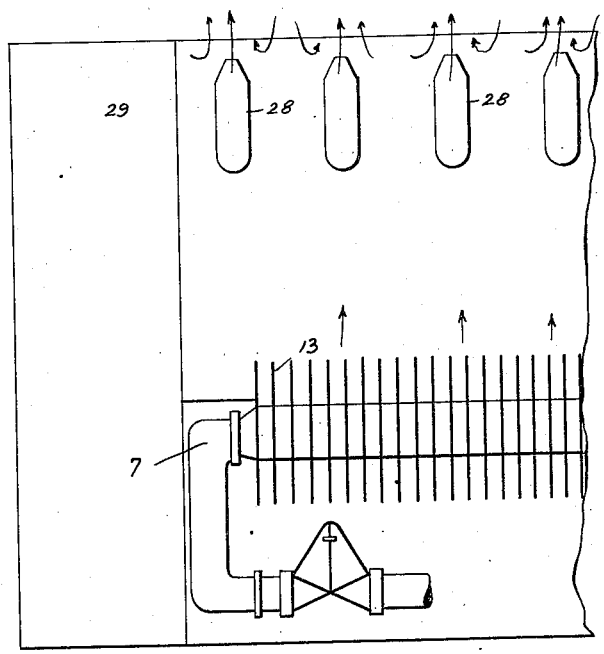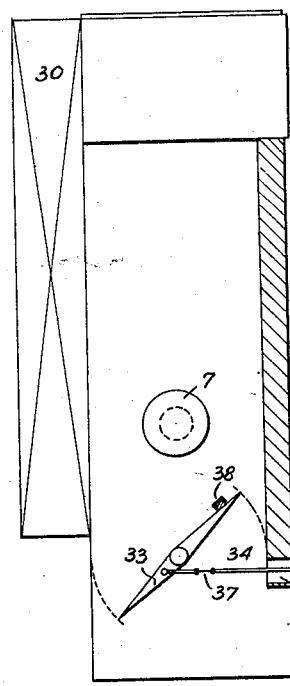

Patented Sept. 20, 1932

1,878,012

UNITED STATES PATENT OFFICE

ALFRED E. STACEY, JR., OF ESSEX FELLS, AND CARLYLE M. ASHLEY, OF SOUTH ORANGE, NEW JERSEY, ASSIGNORS TO CARRIER ENGINEERING CORPORATION, OF NEWARK, NEW JERSEY, A CORPORATION OF NEW YORK

AIR CONDITIONING AND DISTRIBUTING UNIT

Application filed June 25, 1930. Serial No. 463,679.

This invention relates to heating, ventilating and air conditioning systems, and more particularly to means for controlling air circulation and temperatures.

The general object of the invention is to provide simple and inexpensive means for causing a circulation of air in a given area responsive to directed discharge of a relatively small quantity of conditioned air. The conditioned air, however, will not be directly introduced within the area served, but will cause the induction of a relatively larger quantity of air from said area which, in combination with the conditioned air, will form a mixture of predetermined character.

A feature of the invention resides in the provision of a unit adapted to be readily incorporated within a wall or partition of an enclosure, and be variously positioned as the needs of comfort or structural design dictate. The unit itself may be readily assembled as a single structure, or is adapted to be erected and assembled subject to structural limitations at the point of installation.

A further feature resides in the provision of a heating and ventilating unit arranged to be operatively associated with an air conditioning system, whereby conditioned air from a desired source may be utilized in combination with the apparatus of the unit for forming a final air mixture of a temperature and relative humidity different from that of the conditioned air alone. Thus, air from a conditioner or similar source may be introduced within the unit and thereupon caused to mix with air from a second source. A tempering control may simultaneously be utilized, so that the conditioned air, either alone or in combination with the air from the second source, may be directly introduced within an area to be served, or may be introduced in tempered condition.

A further feature covers the arrangement of heating elements in an air conditioning unit, which may easily be assembled, and are readily accessible for inspection or repair. Control devices for regulating the volume of air served by the heaters and the degree of tempering are also provided.

Another feature covers the provision of a fire damper in combination with a heater and air conditioning unit, whereby the induction and production of drafts in the event of fire is eliminated automatically, and duct work serving the unit, cut off by a damper partition.

Figure 1:
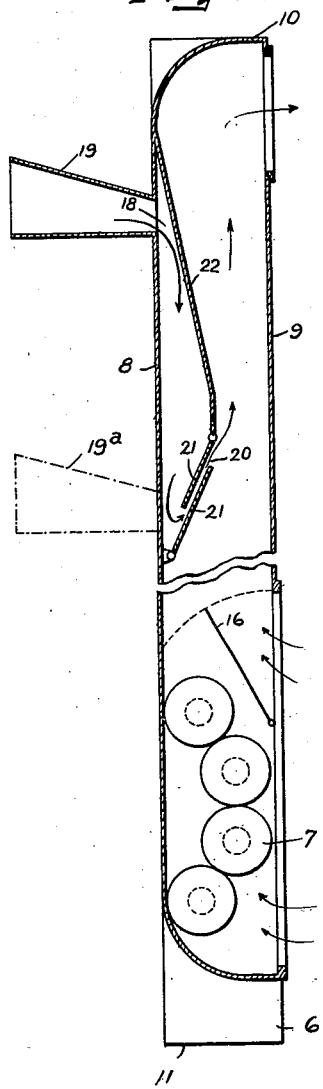
Figure 2:
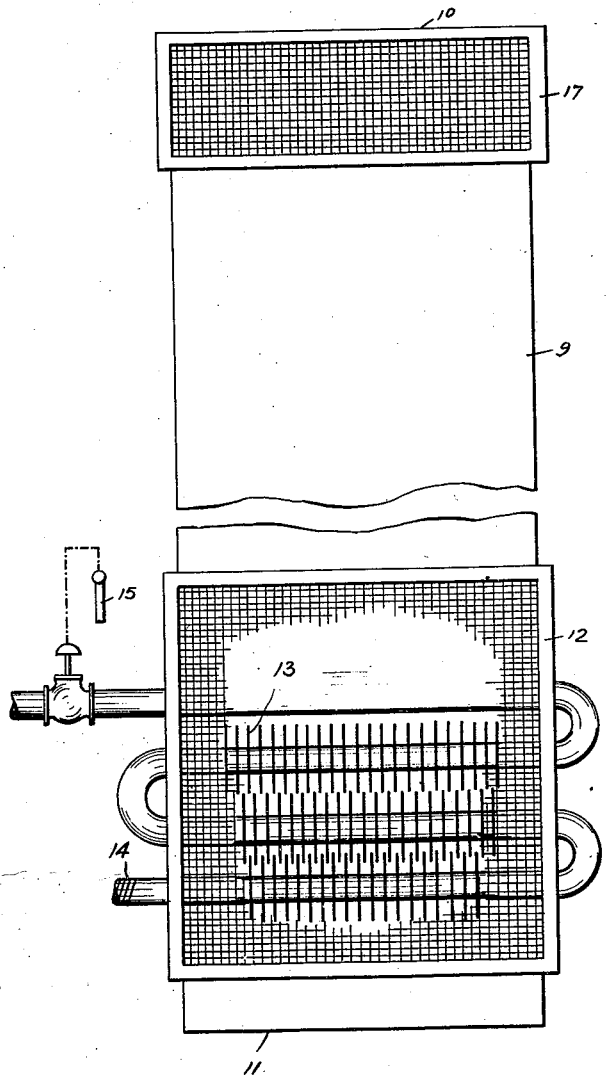

Further features, including advantages in design, assembly, air distribution and diffusion, as well as economy and simplicity in operation, will be more apparent from the following description to be read in connection with the accompanying drawings, in which Fig. 1 is a diagrammatic sectional view of a unit heater incorporating several of the features of the invention, Fig. 2 is a front view of the unit shown in Fig. 1, Fig. 3 is a modified sectional view showing a representative arrangement for returning and recirculating air, Fig. 4 is a fragmentary diagrammatic view of a heater and nozzle arrangement adapted to be used in one form of unit, and Fig. 5 is a diagrammatic sectional view of a unit in which a fire damper is incorporated.

Considering the drawings, similar designations referring to similar parts, numeral 6 refers to a unit made of metal or other suitable material. The unit may be of desired width, usually three to four feet, and of height enabling it to be accommodated within an area to be served. The depth of the unit may vary. Thus, if the unit is inserted within a wall or partition, it may take the same depth, whereas in independent assembly, its depth will be determined by the arrangement of heating coils 7, as well as air distributing apparatus. In the structure of Figs. 1 and 2, outer walls 8 and 9, top 10 and base 11 are assembled together in any approved manner, to form a movable unit. The lower front part of the unit accommodates an inlet grating 12. This may be removably positioned on the unit by bolts or similar means, and this grating preferably holds or mounts in position a plurality of heating coils 7. The heating coils may be securely fastened to the grating by brackets or other suitable means so that the coils and grating form an integral piece of apparatus which may be placed within the unit and removed therefrom as a unitary element. These coils are preferably of the fin type, having radiating surfaces 13 in combination with the steam lines to better produce a heating effect. The extremities of the coils may be suitably threaded for connection to steam lines provided for serving the unit. The extremity 14 is shown free for connection to a coupling or other fitting, and the upper line is shown equipped with a valve controlled by thermostat 15. The thermostat may be suitably positioned in the area served by the unit, and hence will control the amount of steam supplied to the unit responsive to changing conditions. As may be noted, the whole front of the grating is open, and hence will intake air. A damper 16, adapted to be suitably manipulated from without the unit by a handle or other means, may thus apportion the amount of air fed to the unit through the heaters and to the unit above and unaffected by the heaters. Thus, if damper 16 were in closed position, all air would bypass the heaters and go up within the unit, whereas, if it were partially open, as in the position illustrated, some air would go through the heaters and then up within the unit.

At the upper part of the unit is provided an outlet grating 17. This, too, may be removably positioned on the unit and fastened thereto by bolts or the like, so that it may be readily removed and the interior of the unit easily reached.

The unit has an inlet opening 18 positioned within wall 8 at any suitable point. The inlet may be in the form of a slot and extend the width of the unit, or it may comprise a plurality of openings. In Fig. 1, inlet 18 is served by a duct 19. This duct or passage may lead from an air conditioner or any other source, as, for example, the outside atmosphere. While opening 18 is shown at the upper portion of the unit, it is manifest that it can be placed at other points, as illustrated by the duct 19A in dot-dash lines. The position of the inlet and connection thereto, may be varied to suit engineering expediency. The air will enter through inlet 18, pass through nozzle arrangement 20 and be discharged within the enclosure through grating 17. The nozzle arrangement, as illustrated, may be in the form of one or more pairs of plates or baffles 21. These may be suitably hinged, so that their interpositioning may be varied to provide an opening of different size and with different directional effect. The lower baffle 21 may be hinged to the wall 8, whereas the upper one is hinged to element 22. This element extends inwardly from wall 8 and its lower part forms a relatively constricted passage in combination with wall 9. The entrance of air through the plates forming a nozzle arrangement, and its consequent passage through this constricted opening will have an ejector effect, with the result that air from the enclosure will be drawn through inlet grating 12 and through or around the heaters for mixture with the air admitted through the nozzle arrangement.

A nozzle arrangement will be provided for each inlet opening, or one arrangement may serve a plurality of openings. The element 22 may likewise be arranged in one or more parts, so that a constricted passage will be formed at any number of desired points with the wall 9.

Since the unit may be assembled as an integral, self-contained arrangement, it may be readily shifted to different positions, the sole requisite being that a steam line be available for connection to the heaters. Of course, electrical heaters may be substituted for the steam tubing illustrated. However, the unit may be built in, within a partition or wall, and in this event, walls 8 and 9 would constitute the extremities of the building partition in which the apparatus is placed. The coils, in combination with the grating and damper, would be mounted as a single unit within the partition, and grating 17 would similarly be mounted within the finished wall of the enclosure. Suitable insulation could be employed to prevent losses and leakage, and the inlet openings could very easily be arranged to lead from a central source of air or from outdoors in the event the unit were erected in an outer wall.

In Fig. 3, a modified form of unit is shown, in which a stationary nozzle 23 is employed. This nozzle may extend the full width of the unit, or, as in Fig. 4, a plurality of individual nozzles may be provided at fixed intervals. The nozzle shown in Fig. 3 has a constricted opening 24, through which conditioned air or air from any desired source may be discharged at a predetermined velocity. The nozzle itself forms two constricted passages 25, between itself and the walls 8 and 9. Air from the enclosure may be intaken within the unit through return dampers 26, and recirculating dampers 27. These dampers may be adjusted so that more or less air will be passed through the heating coils 7, or bypassed around the heating coils. The dampers 26 and 27, as well as the discharge grating 17, may all be removably positioned on the unit, as in Figs. 1 and 2, and the heating coils may also be removably positioned.

The discharge of air through nozzle 24 will naturally cause an induction of air from the enclosure through dampers 26 and 27, depending upon their position. The mixture of air from the nozzle and induced air through the dampers will be discharged through opening 17, within the enclosure.

In Fig. 4, a plurality of nozzles 28 are suitably positioned within a unit at desired intervals. An air passage 29 feeds the nozzle 28. The discharge from the nozzles will create a series of streams or curtains of air, with the result that the induced air passing between the streams of discharged air will commingle with the discharged air to form a substantially uniform mixture. This is advantageous under summer operating conditions where the air from the nozzles would be cold, dehumidified air, whereas the induced air would be room air. The passage of room air between the streams or curtains of conditioned air would serve to temper the conditioned air to form a mixture at comfortable temperature. So also, under winter conditions, heated air passing between the discharged streams which could, in this case, be room air, would form a mixture of greater volume than the heated air and at a reduced moderate temperature.

The arrangement in Fig. 5 illustrates an automatic control for regulating air volume from an air supply plenum 30, and for cutting off the plenum from the unit in the event of fire. A bellows or other thermoresponsive control, such as a bimetallic member or the like, 31, is operatively connected to a lever 32 adapted to control damper 33 through connecting rod 34. Manually controlled regulator 35 may be employed to increase or decrease the tension of spring 36 bearing against lever 32 in a direction opposite to that exerted by the force of the bellows. Thus, the damper will be actuated responsive to changing conditions or the atmosphere surrounding the bellows, within limits determined by the tension of spring 36. Air from plenum 30 will, therefore, pass through the damper, contact with the heating coils 7, and then proceed through the unit. The nozzles and recirculating, as well as discharge grills are not shown, but any suitable arrangement, as described in connection with Figs. 1—4 may be employed.

In the event of fire, it would be desirable to cause damper 33 to close completely in order that plenum 30 and its source of supply be cut off from the unit. This will eliminate drafts and also prevent the fire spreading through the duct work. For illustrative purposes, applicant shows a fusible link 37, as part of rod 34. In the event of fire, this link will melt, the rod be broken, and the damper fall to a closed position, due to the slight weighted portion 38 on its upper leaf. While the fusible link is shown as part of rod 37, it is manifest that any analogous means may similarly be provided for causing the linked connections to be broken in the event of fire and the damper to fall to a closed position.

It may be noted that opening 39 is provided whereby air from the atmosphere of the enclosure will be drawn within plenum chamber 30. Although the passage is very and influencing circulation of air from the enclosure in the vicinity of the bellows 31, thus causing it to respond more promptly to changing conditions in the enclosure.

Applicants do not limit themselves to the precise arrangements described, which are deemed merely illustrative of the invention, and are not to be construed in a limiting sense. Any analogous means for utilizing nozzle arrangements in combination with heating means, and in which a plurality of streams of air may be employed, in a unit structure, are deemed within the purview hereof.

Having described our invention, what we claim as new and desire to secure by Letters Patent, is:

1. A unit of the character described having air heaters, means for intaking air within said unit through said heaters, means for intaking air within the unit in a course bypassing the heaters, and a nozzle arrangement fed from a desired source, for producing an induction effect capable of causing said intaking of air within the unit.

2. In a unit of the character described, a heater, a grating for permitting air to enter the unit, said grating and heater being integrally assembled and positioned within the unit as a single element, and means for proportioning a volume of air passing through said grating within the unit, whereby some of the air will go through the heater and some of the air bypass the heater.

3. A unit of the character described having an air heater at the lower portion thereof, an air inlet below the heater, an air inlet above the heater, a discharge outlet at the upper portion of the unit and a nozzle within the unit, the discharge of air through said nozzle causing air to be drawn within the unit through said inlets to form a mixture discharged through the outlet.

4. An air distributing unit having a series of nozzles therewithin, a heating element at the lower portion of the unit, adjustible means for controlling an air volume taken in through the heater within the unit and a volume of air taken in within the unit and bypassing the heater, the discharge of air through said nozzles creating a series of curtains of air causing the induction of streams therebetween constituting said air volumes drawn within the unit through and bypassing said heater, and a discharge opening at the upper portion of the unit.

5. A unit of the character described having a primary supply of air served by a conditioning source, means comprising a portion of the unit serving as a Venturi passage for inducing a secondary supply of air within the unit from the atmosphere served by the unit, and tempering means within the unit in the path of the secondary supply.

6. A unit of the character described having tempering means, an air inlet, the air being adapted to be varied in temperature by said means, a nozzle served by a source other than said inlet, the unit having an inner member combining within a wall of the unit to form a Venturi section, said nozzle discharging within the venturi, whereby a greater pressure is available for inducing a circulation of air through said inlet from the atmosphere served by the unit.

7. An air circulation unit having means for supplying a primary stream of air from a conditioned source, means for intaking a secondary stream of air from the atmosphere served by the unit, tempering means within the unit, and means for converting the velocity energy of the primary stream to pressure energy, whereby both streams of air will be discharged from the unit at sufficiently high velocity to cause great diffusion in the atmosphere served by the unit.

8. In a unit of the character described an inlet for admitting air from the room served by the unit, heating means in combination with the inlet, a nozzle within the unit for supplying air from a source other than the room, an outlet for discharging air from the unit, and a Venturi passage comprising, in part a wall of the unit, for creating a circulation of air through the unit independently of the discharge of air through the nozzle, whereby the room may be heated by convection.

In testimony whereof we affix our signatures.

ALFRED E. STACEY, Jr.
CARLYLE M. ASHLEY.